United States Patent [19]

Blake et al.

[11] Patent Number: 4,515,824

[45] Date of Patent: May 7, 1985

[54] PREPARATION OF CAKES AND NO-STIR DRY MIX FOR THEIR PREPARATION

[75] Inventors: Jon R. Blake, Brooklyn Center; Richard K. Knutson, Corcoran; Glenn J. VanHulle, Brooklyn Park, all of Minn.

[73] Assignee: General Mills, Inc., Minneapolis, Minn.

[21] Appl. No.: 409,204

[22] Filed: Aug. 18, 1982

[51] Int. Cl.³ .............................................. A23D 10/04
[52] U.S. Cl. ................................. 426/554; 426/555; 426/285
[58] Field of Search .......................... 426/552–555, 426/249, 453, 549, 285

[56] References Cited

U.S. PATENT DOCUMENTS

| | | | |
|---|---|---|---|
| 2,535,319 | 12/1950 | Redinger | 426/249 |
| 3,135,612 | 6/1964 | Hair et al. | 426/535 |
| 3,393,074 | 7/1968 | Ehrlich | 426/94 |
| 3,653,917 | 4/1972 | Wahba et al. | 426/552 |
| 3,694,229 | 9/1972 | Norsby et al. | 426/55 |
| 3,708,309 | 1/1973 | Johnson et al. | 426/555 |
| 3,713,845 | 1/1973 | Kuffel | 426/555 |
| 3,715,216 | 2/1973 | Wuhrmann et al. | 426/590 |
| 3,975,549 | 8/1976 | Shatila et al. | 426/550 |
| 4,021,582 | 5/1977 | Hsu | 426/99 |
| 4,073,951 | 2/1978 | Sargeant | 426/285 |
| 4,156,020 | 5/1979 | Bohrmann et al. | 426/96 |

OTHER PUBLICATIONS

Chemical Engineer's Handbook, Fifth Edition, ed. by R. H. Perry and C. H. Chilton, McGraw-Hill Book Co., 1975, pp. 8-57 to 8-65.
"Agglomeration Processes in Food Manufacture", Noyes Data Corp., 1972, pp. 202-221.

Primary Examiner—Raymond Jones
Assistant Examiner—Elizabeth A. King
Attorney, Agent, or Firm—Gene O. Enockson; John A. O'Toole

[57] ABSTRACT

Disclosed are dry mixes for cakes, comprising conventional full formulation dry mixes in a particular physical form. The present granulated dry mixes can be used to prepare finished cakes by conventional baking but without requiring such steps as mixing to form a batter, or batter aeration or coating the baking container. The granulated dry mixes are characterized by the physical features of (1) particle size, (2) bulk porosity, (3) density, (4) initial rates of moisture absorption, and (5) moisture content. The particle size essentially ranges from about 0.9 to 3.0 mm. The bulk porosity essentially ranges from about 0.55 to 0.64. The density essentially ranges from about 0.45 to 0.70 g./cc. The rates of initial moisture absorption essentially range (at 70° F., 21° C.) from about 0.055 to 0.075 gram of water per gram of mix per second.

14 Claims, No Drawings

PREPARATION OF CAKES AND NO-STIR DRY MIX FOR THEIR PREPARATION

BACKGROUND OF THE INVENTION

1. Technical Field of the Invention

The present invention relates to food products. More particularly, the present invention relates to dry culinary mixes for the provision of baked goods, namely cakes.

2. The Prior Art

The use of prepared mixes has received wide usage, particularly in home baking. These dry mixes provide convenience by eliminating the steps of ingredient selection, measurement and blending. To prepare cake batters from these dry mixes for baking, liquid materials such as water or milk, liquid shortening, eggs, etc. are added and the combination is then mixed to form a homogeneous mixture or batter and beaten to incorporate air. The resulting aerated batter is then typically transferred to a greased pan or tray and then baked to obtain finished cakes.

While these dry culinary mixes are convenient, it is apparent from the above description that the typical cake preparation procedure still contains several steps. It would be desirable then to eliminate one or more of these steps to provide products of even greater convenience. To this end, certain products have been marketed from time to time which attempt to provide greater convenience to the user. For example, one such product comprises previously hydrated batter. While somewhat more convenient, such products suffer from several disadvantages by virtue of the presence of water, e.g., limited shelf life, require special storage such as refrigeration, etc. These disadvantages have prevented these products from obtaining widespread acceptance.

Most art efforts then have been directed toward providing dry mixes for cakes and to improving both the use or characteristics of the dry mix or of the finished cake prepared therefrom. Dry mixes for cakes may be divided into two groups, namely, shortening-type mixes, e.g., layer cakes and non-shortening type mixes, e.g., angel food cakes. The present invention relates in particular to shortening-type cake mixes. Shortening-type cake mixes contain, as major ingredients, flour, sugar, and shortening. To these major constituents other ingredients such as emulsifiers, (generally incorporated into the shortening) starches, flavors, leavening, egg solids, non-fat milk solids may be added.

Greater convenience in using dry mixes can be provided by "full formulation" cake mixes. Full formulation mixes are distinguished from partial formulation mixes in that only water need be added for mixing and beating to form an aerated batter. Such full formulation mixes are commercially available and enjoy widespread acceptance particularly in the food service or commercial food industry. However, such dry mixes still require formation of an aerated batter and, typically, transference to a greased baking container.

Full formulation cake mixes, while convenient as regards time of mixing, nevertheless require the addition of prescribed quantities of water, blending at low speed to form a batter and subsequent aeration. Even greater convenience for the at-home preparation of layer cakes are provided by the "stir-in-the-pan" layer cake dry mixes. Typically, these are full formulation cake mixes which are specially formulated to be rapidly rehydratable and to be hand mixable. (See, for example, U.S. Pat. No. 3,694,229, issued Sept. 26, 1972 to N. Norbsy et al.) Certain cake mixes of this type contain agglomerated all purpose wheat flour as a component to aid in the rapid hydration of the cake mix. (See, for example, U.S. Pat. No. 3,708,309, issued Jan. 2, 1973 to G. E. Johnson et al.) each of which are incorporated herein by reference. However, even these mixes must still be hand stirred to form a batter. Moreover, these cake mixes are typically marketed in combination with specially coated containers so that batters can be prepared in the baking pan and thereafter baked without the cake sticking to the pan.

The present invention provides an improvement in full formulation culinary mixes. It has been surprisingly discovered that full formulation dry culinary mixes can be provided which do not require mixing to form a batter, nor require batter aeration, nor require greasing or coating the baking container. It has been surprisingly discovered that conventional full formulation mixes can be provided in a particular physical form referred to herein as "hyper agglomerates" or "granules" fabricated using particular agglomeration techniques which eliminate these previously recognized as essential preparation steps in the provision of a baked layer cake. The present mixes in the form of granules are additionally characterized by particle size, density, bulk porosity, initial rates of moisture absorption, and moisture content.

Of course, agglomeration is an old technique in the food art and a variety of food products are available in agglomerated form. Additionally, the food art is replete with agglomeration techniques. (See, for example, "Agglomeration Processes in Food Manufacture," by Nicholas Pintauro, Noyes Data Corporation, 1972.) Generally, food products are agglomerated to improve one or more of several product attributes. First, food products have been agglomerated to improve aesthetics. For example, soluble coffee powders have been agglomerated primarily for product aesthetics. Second, agglomeration has been more commonly used to provide products of improved material handling, e.g., pourabiity. Exemplary agglomerated products and methods include those described in U.S. Pat. No. 4,073,951, (issued Feb. 14, 1978 to R. G. Sargeant); U.S. Pat. No. 3,715,216, (issued Feb. 6, 1973 to Wuhmann et al.). Most commonly, very large numbers of food products have been agglomerated in the past to enhance their solubility or dispersion characteristics in liquids. These products include flour, non-fat dry milk solids, cocoa, sugars, eggs, etc. Exemplary products and methods of preparation are disclosed in U.S. Pat. No. 4,156,020 (issued May 5, 1979 to Bohrmann et al.); U.S. Pat. No. 4,021,582 (issued May 3, 1977 to J. Y. Hsu); U.S. Pat. No. 4,016,337 (issued Apr. 5, 1977 to J. Y. Hsu).

While these agglomerated products and methods have been used in the past for the provision of products exhibiting improved aesthetics, material handling and dispersability in liquids, it has been surprisingly discovered that agglomeration can be employed to provide the present "pour-and-bake" layer cake mixes. In particular, the present granules are generally larger in size than those of other food products and thus the present dry mixes are referred to herein as having been "hyper agglomerated."

SUMMARY OF THE INVENTION

The present invention relates to dry mixes for layer cakes in a particular physical form referred to herein as "granulated" or "hyper agglomerated." The present invention provides mixes from which cakes most surprisingly can be conventionally baked without mixing to form a batter, or without batter aeration, or without coating the baking container, or without transferring the aerated batter to the baking container.

The present dry mixes comprise conventional full formulation layer cake mixes in the form of granules essentially characterized by the physical features of (1) particle size, (2) bulk porosity (total void volume/total volume), (3) density, (4) initial rates of moisture absorption, and (5) moisture content.

The particle size of the present hyper agglomerates essentially ranges from about 0.9 to 3.0 mm. The bulk porosity essentially ranges from about 0.55 to 0.64. The density essentially ranges from about 0.45 to 0.70 g./cc. The rates of initial moisture absorption essentially range (at 70° F.) from about 0.055 to 0.075 gram of water per gram of mix per second (g./g.s.). The moisture content is desirably less than about 5% by weight.

In its method aspect, the present invention embraces processes for the preparation of finished cakes from granulated dry mixes.

DETAILED DESCRIPTION OF THE INVENTION

The improved dry mixes for layer cakes of the present invention can be used to provide finished or baked layer cakes. The improvement resides in the provision of dry mixes which enable the elimination of several previously-recognized-as-essential steps of finished cake preparation: namely, batter mixing, batter aeration and container greasing. The improved cake mixes are novel in physical form (referred to herein as "hyper agglomerates" or equivalently as "granules") and are essentially characterized by particle size, bulk porosity, density, moisture content, and initial rates of moisture absorption. Each of these physical attributes as well as cake formulation, method of granule preparation, and product use are described in detail below. In its method aspect, the present invention resides in finished cake preparation processes comprising fewer required steps.

Throughout the specification and claims, percentages and ratios are by weight and temperature in degrees Fahrenheit, unless otherwise indicated.

Full formulation cake mixes of both the shortening containing, e.g., layer type or non-shortening containing, e.g., angel food, are well known in the art and such conventional full formulation is useful herein for fabrication into the present granules. The art is replete with compositions suitable for use such as are described in the '309 and '229 patents referenced above. Additional suitable layer cake formulations are given in U.S. Pat. No. 3,135,612 (issued June 2, 1964 to E. R. Hair et al.) Exemplary chiffon cake formulations can be found in U.S. Pat. No. 3,713,845 (issued Jan. 30, 1973 to Kuffel). Useful angel food cake mixes can be found in U.S. Pat. No. 3,653,917 (issued Apr. 4, 1972 to Wahba et al.) Each of these references are incorporated herein by reference.

The present invention finds particular usefulness in the provision of layer cakes. Generally, full formulations for dry layer cake mixes comprise:
about 35% to 45% flour;
about 30% to 60% sucrose;
about 1% to 16% shortening;
and from about 0.3% to 10% chemical leavening agent.

Optionally, other selected ingredients, e.g., non-fat dry milk solids, starch, or whole egg solids can each comprise up to about 3% of the cake mix. Any emulsifiers employed are typically blended with the shortening and make up from about 0.70 to 0.90% of the cake mix fraction. Since the present invention finds particular suitability for use in connection with layer cakes, the following description of the present invention generally refers to layer cakes. It is to be appreciated, however, that as indicated above, the present invention contemplates other cake types as well.

1. Particle Size

As indicated above, the physical structure of the dry layer cakes of the present invention are distinct from the physical structures of cake mixes of the prior art.

Importantly, the present cake mixes are provided in the form of granules essentially characterized in part by particle size. The present cake granules essentially range from about 0.9 to 3.0 mm. in smallest linear dimension. Cake fraction granules within this range can be supplied by granules having the following sieve screen analysis:

| Weight % | U.S. Standard Size |
|---|---|
| 100% | Through No. 6 |
| 0% | Through No. 20 |

Oversized granules are to be generally avoided since great difficulties exist in ensuring complete hydration of oversized granules. Deficient hydration of granules can undesirably result in finished cakes having hard spot defects. Conversely, undersized granules are also to be generally avoided since difficulties can arise in uneven absorption of moisture due to the higher surface area of the smaller cake fraction granules. Differences in moisture absorption can lead to absence of cake phase homogeneity.

Better results in terms of granule rehydration are obtained when the granules range in shortest dimension from about 1.4 to 2.0 mm. Cake fraction granules within this preferred size/range can be supplied by granules having the following sieve screen analysis:

| Weight % | U.S. Standard Size |
|---|---|
| 100% | Through No. 10 |
| 100% | On No. 14 |

While particle size is an important physical feature of the present granules, it is the combination of physical features of the present granules which are important to their usefulness herein.

2. Bulk Porosity

Another essentially important physical feature characterizing the present cake mix in granule form is "bulk porosity," or "void space," i.e., the total void volume/total volume of the granulated cake mix. It is intended that the consumer will pour a package of the present cake mix in granule form to an ungreased baking container. Thereafter, a measured amount of liquid, typically water, will be added directly to the pan, and then baked immediately thereafter. For proper rehydration and in situ batter formation during the early part of the baking cycle, it is important then that the volume of liquid added be approximately equal to the total void volume of the granulated cake mix.

Undesirable effects can result from deficiencies in granule bed water fill levels, i.e., when either the volume of liquid to be added exceeds or fails to equal the total void volume. If in excess, a top or overlayer of water will lie over the top surface of the granules. The granules may fail to completely hydrate during the baking cycle and form defects in the finished cake. Additionally, the specific volume of the finished cake may be undesirably decreased. If the volume of liquid addition is deficient, then the top layer of granules above the level reached by the added liquid may fail to rehydrate at all resulting in a charred top crust in the baked product.

Selection of specific bulk porosities will be influenced primarily by the desired weight percent of moisture desired to be added. Thus, for example, for a specific mix formulation, it may be desirable to add sufficient water such that the combination prior to baking has a moisture content of 40% by weight. If such a mix is fabricated into granules according to the present invention having a density of 0.65, and a bulk porosity of 0.5, then 100 ml. of granules would weigh 65 g., and contain 50 ml. of void space. For a desired moisture content of 40%, about 43 ml. of water would need to be added to the granules and would approximately equal the total avoidable void space. While not exact, this correlation is best with lower bulk porosities and higher densities. Generally, less water is added than which is theoretically required to fill the available void space as measured by the method described below. While not wishing to be bound by the proposed theory, the disparities are believed due to the surface tension of water which prevents it from quickly occupying the smaller void regions of high porosity and low density granules.

Of course, the bulk porosity will be influenced not only by the size but also the shape of the granules. While in the preferred embodiments of the present invention the present granules are spherical in shape, the present invention embraces other shapes both irregular and regular shapes, e.g., oval or ellipsoid.

A determination of bulk porosity as defined above is made as follows:
1. 10.0 Grams of granules are poured into a 100 ml. graduated glass cylinder. The volume it occupies = V. e.g., 25 ml.
2. 60 Milliliters of carbon tetrachloride are poured over the granules in the cylinder and allowed to stand until air bubbles no longer rise to the surface. The total volume of carbon tetrachloride and submerged granules equals $V_2$, e.g., 67 ml.
3. Bulk porosity is calculated from these data, thus:

$$B.P. = \frac{\text{void volume}}{\text{total volume}} = \frac{V - (V_2 - 60)}{V}$$

$$\frac{\text{Volume of available voids } (25 - 7)}{\text{Total volume}} = \frac{18}{25} = .72 \text{ bulk porisity}$$

The granules of the present invention desirably range in bulk porosity from about 0.55 to 0.64. Better results in terms of hydration control, i.e., avoiding a surplus or deficiency of moisture are obtained when the bulk porosity ranges from about 0.58 to 0.62.

3. Density

Another important physical feature of the present granulated cake mixes is their density. Density control is important to realization of granules of the present invention exhibiting desirable rates of moisture absorption. Granules useful herein have a density essentially ranging from about 0.45 g./cc. to 0.70 g./cc. Better results in terms of desired rehydration and water filling of the granule bed are obtained when the density ranges from about 0.50 to 0.60 g./cc.

4. Moisture Content

The moisture content is an important feature of the present granules. The moisture content strongly affects the initial rate of moisture absorption as well as other features of the granules. It is essential that the moisture content be less than about 5%. Better results in terms of finished cake grain texture and specific volume are obtained when the moisture content of the present granules is less than about 4%. For best results, the moisture content is desirably less than about 3%.

5. Initial Rate of Moisture Absorption

Still another important physical feature of the present granules is the initial rate of moisture absorption. The term "rate of moisture absorption" is defined as the speed at which the agglomerates absorb water. Should this rate be too fast, the particles first contacted by the reconstituting liquid will absorb a disproportionate quantity of water resulting in an uneven distribution of water. Should the rate be too slow, the particles will not attain the desired degree of rehydration within the baking cycle and as a result, the finished cake will be a succession of watery areas, which were originally the voids, and heavy areas, with dry centers, which were originally the location of the dry granules. Ideally, the rate of absorption should be such that the rehydrating liquid will flow into all of the void areas in the consolidated mass before substantial swelling occurs and before release of $CO_2$ from the leavening, each of which are dependent upon the temperature increase occurring during the baking cycle.

Suitable absorption rates, in terms of weight of water absorbed per dry weight of granules, are in the range of the aforementioned 0.055 to about 0.075 grams of water per gram of product per second. Better results are obtained when the rates range from about 0.055 to 0.060 g./g.s.

The determination of agglomerate moisture absorption rate can be accomplished as follows. To 5 gram increments of dry granules in a shallow pan, is added an excess of water, i.e., 25 milliliters of water. Tests are conducted with water temperatures of about 70° F. (21° C.). After about 10 seconds, the excess water is poured off and measured. The total amount absorbed is corrected for the time interval and quantity of granules, and calculated and expressed in units of grams of water absorbed per gram of product per second.

OPTIONAL INGREDIENTS

The present dry mixes can optionally contain a variety of additional ingredients suitable for rendering finished cakes prepared therefrom more organoleptically desirable. Such optional dry mix components can include chocolate chips, candy pieces, flavoring nuts, fruit pieces, preservatives, vitamins and the like. If present, such optional components comprise from about 1% to 10% of the dry mixes of the present invention.

It is an unexpected advantage of the present invention that superiority in supporting particulate layer cake adjuvants is provided. Since a batter is formed only for a brief period during the baking cycle, less support for these materials is needed. Also, greater control over placement of such materials is possible since mixing can be eliminated. Moreover, relatively greater quantities of adjuvants can be added without fear of overloading the cake structure or settling of the added materials.

METHOD OF PREPARATION

The present granules can be prepared using conventional agglomeration apparatus and techniques. The art is replete with suitable methods and equipment. Preferred for use herein are those employing moisture as the binding agent. In particular, it has been found that a disc pelletizer such as Model 036 VD Stainless Steel manufactured by Ferro-Tech, Wyandotte, Mich., is especially suitable for use herein. Another apparatus useful herein is a Schugi Flexomix ®160 (manufactured by Schugi B. V., Amsterdam, Netherlands). An advantage of employing a disc pelletizer lies in the tight control over the particle size of the present granules compared to other agglomeration apparatus techniques. Such an advantage is especially important in providing the extra large granules of the present invention.

The particular physical properties of the granules are adjusted in known manner by control of the operating conditions of the particular agglomerator. For the disc pelletizer, for example, operating parameters include angle of incline of the bed, bed depth, RPM of the disc, the rate of water addition and amount of water added per unit weight of dry mix. Other minor operating conditions include the position of the plow as well as the location of the dry feed addition and the water spray. Particle size is controlled primarily by the discharge screening of the pelletizer. However, yields of desirably sized granules are influenced by operating conditions.

Generally, bulk porosity is controlled by the extent of granule surface irregularity. Greater irregularity increases porosity. Using the disc pelletizer, increases in bulk porosity are obtained with steeper bed angle, shallower bed depth, faster RPM's, higher rates of water addition and lower unit water additions.

Similarly, higher densities are obtained with gentler bed angle, deeper bed depth, slower RPM's, lower rates of water addition and higher unit water additions.

Initial rates of moisture addition are dependent upon final moisture content, by density and bulk porosity. Generally, higher rates are obtained with lower densities, higher bulk porosities, and lower final moisture contents.

In a typical manner of preparation, the ingredients for the full formulation are blended together to form a homogeneous mixture. Thereafter, the mixture is agglomerated at room temperature using water as the binding agent and generally bringing the moisture content up to about 8-14%. Typically, both the dry particulate cake mixture and the water are continuously and carefully metered into the inclined disc of the conventional pelletizer and tumbled. The dry particulate material is carried beneath a spray of water so that tiny agglomerates or seeds first form and then increase in size as rotation of the disc is continued, with the moistened particles being tumbled and rolled on the disc until granules of the desired size and other properties are formed and discharged from the disc. Thus, the particles on which water is sprayed develop surface stickiness and agglomerate together while moving through a certain angular distance over the surface of the disc before following back toward the lower rim of the disc. As rotation of the disc continues, the granules rise to the surface of the particulate mix and overflow the rim when they have reached the desired size.

The specific conditions will vary with each dry mix formulation and can be readily established by routine experimentation. Typically, the disc is inclined at an angle of about 45° and is rotated at a speed of about 15-25 RPM. The granules formed are screened and over- and under-sized granules recycled. Thereafter, the granules are dehydrated in conventional manner, e.g., with tray drying or vibrating bed drying each with forced hot air (110° to 180° F., 43° to 82° C.) convection. The moisture content desirably is reduced to less than about 5%.

COMPOSITION USE

The present granulated dry mixes prepared as described above are conveniently prepared into finished cakes by a simple "pour-and-bake" operation. The granulated cake mix is poured into an ungreased container and distributed evenly by gravity alone. Thereafter, a measured amount of water is added to the dry mix typically to yield a moisture content of from about 35% to 45%. The combination can then be, and preferably is, baked immediately thereafter in any conventional manner without prior mixing or aeration, for example, for 25 to 40 minutes at 350° F. to 425° F. or microwave heating for about 9 to 10 minutes at a rate of about 0.5 to 1.0 watt/g. ("high") typical setting.

During baking the granules rehydrate and form a batter in situ. While not wishing to be bound by the proposed theory, it is speculated herein that the elimination of greasing (or otherwise providing the baking container with a non-stick coating) results from the added water or other liquid initially forming the continuous phase and being in contact with the container during the initial part of the baking cycle.

Of course, if desired, the consumer may ignore the advantages provided by the present cake mixes and use the mix in a conventional manner. The consumer could then beat the water and cake mix combination to form a batter and then to aerate the batter, transfer to a greased container and then bake as above.

The present invention can be used to prepare finished cake products, those which either cannot be prepared by present cake preparation mixes and techniques or those which can be prepared only with great difficulty. For example, swirl cakes comprising a first region of one flavor and/or color cake, e.g., white, and a second region of second flavor and/or color cake, e.g., chocolate, can be readily prepared by employing granules of two cake mixes. Since no stirring is required in the cake preparation, and since the granules do not move during hydration, complex patterns in finished cakes can be easily realized. For example, finished cakes can be easily prepared comprising alternating thin layers of white and chocolate whether vertically or horizontally oriented.

A unique form of finished cake can be realized, it is believed, only by employing the granules of the present invention. This unique form of cake is prepared from a plurality of granules of different colors randomly mixed. The unique finished cake prepared therefrom is referred to as a "variegated color cake." The granules can also be a different flavor if desired, e.g., cherry flavored for a red granule.

The following examples are offered to further illustrate but not to limit the invention disclosed herein.

EXAMPLE I

A 1,000 lb. (454 kg.) batch of dry mix for a white layer cake in the form of granules of the present invention having the following formulation is prepared as follows:

| Ingredient | Weight % |
|---|---|
| Sucrose (cake grind) | 38.89 |
| Flour | 37.00 |
| Shortening (plastic) | 11.00 |
| Dextrose | 5.00 |
| Shortening (solid) | 2.00 |
| Egg white solids | 1.00 |
| Egg yolk solids | 1.00 |
| Non-fat dry milk solids | 1.00 |
| Leavening | 1.85 |
| Salt | 0.80 |
| Vanilla powder | 0.20 |
| Color | 0.16 |
| Gum | 0.10 |
| | 100.00% |

The dry ingredients are weighed and blended in a ribbon blender for five minutes. The heated (120° F., 49° C.) shortening is then added with a piston pump. The mixture is then blended and delumped with a cake finisher.

The cake mix is then fed at a controlled rate of three lbs./mn. (1.3 kg./mn.) to a disc pelletizer using a screw conveyor (Acrison, Inc. Model 1057). The 3 ft. (apx. 0.915 m.) disc pelletizer (Ferrotech, Model No. 036 VD Stainless Steel) is operated at 17 RPM, a disc angle of 50° and a bed depth of about eight inches. Water is atomized onto the mix at a rate of 120 ml./min. About 85% of the granules so prepared range in size from about on No. 10 to on No. 14 U.S. Standard size mesh. The granules have a moisture content of about 9.5 to 12.5%. The granules are then dried in a forced hot air dryer at 110° to 120° F. (43° to 49° C.) for about 4 hours until a moisture content of about 3-4% is achieved. The granules are then screened so that about 98% range in size of from about 1.4 to 2.0 mm.

The granules so prepared are additionally characterized by a bulk porosity of 0.55, a density of 0.60, and an initial rate of moisture absorption of 0.060 gram of water per gram of granules per second.

635 g. of the granules so prepared are added to a 9 in.×13 in.×2 in. (apx. 23 cm.×33 cm.×5 cm.) baking container. 423 g. of water then are added to the container. The mixture is then baked immediately thereafter without mixing or aeration at 350° F. (177° C.) for 25 to 30 min. to form a finished cake.

EXAMPLE II

A small batch of dry mix chocolate layer cake in the form of granules of the present invention having the following formulation is prepared as follows:

| Amount | Ingredient |
|---|---|
| 383.90 g. | Sucrose[1] |
| 343.00 | Flour[2] |
| 115.00 | Shortening[3] |
| 40.00 | Dextrose |
| 25.00 | Pregelatinized starch |
| 20.00 | Cocoa |
| 20.00 | Dried egg whites |
| 12.50 | Dried egg yolk |
| 10.00 | Sodium bicarbonate |
| 8.00 | Salt |
| 11.50 | Flavor |
| 3.00 | Leavening acid |
| 1.00 | Gum |
| 7.10 | Color |
| 1000.00 g. | |

[1] A mixture of granular sucrose and microfine sucrose of 50 microns (90% through a U.S. Standard Sieve No. 270). The weight ratio of granular sugar to microcrystalline sucrose is approximately 1:3.
[2] An all purpose flour made from selected soft red winter wheats having a protein content of 8 to 10% by weight.
[3] Having a Solid Fat Index of approximately 22–26% at 70° F. (21° C.) and comprising about 10% by weight of the shortening of a food grade emulsifier comprising a mixture of mono and polyglycerol monoesters of stearic and palmatic acid marketed by Durkee Foods.

The ingredients are weighed and the dry ingredients are blended together in a mixing bowl. The shortening is added slowly with low speed mixing until only about 25% of the mix is retained on a No. 10 screen (about 6 to 10 minutes). The mix is then delumped in a laboratory sized vertical cake finisher until the mix passes through a No. 100 screen.

1,000 g. of the mix is then transferred to a large mixing bowl for granulation. About 90 g. of room temperature water is slowly added by a pipette to the mix at a rate of roughly about 20 g./minute while stirring the mix with moderate agitation to evenly wet the mix. The granules so prepared are dried at 120° F. (49° C.) for about 4 hours. The moisture content is then about 3%.

The granules are then screened. A sieve screen fraction (about 60% of the granules) having the following analysis is selected:
Through No. 10: 100%
On No. 14: 100%

The over and undersized granules are then reworked by grinding to pass through a No. 50 screen and then repeating the granulation step above until having the desired sieve screen analysis.

The granules so prepared are additionally found to have a bulk porosity of 0.58, a density of about 0.56 g./cc. and an initial rate of moisture absorption of about 0.065 g. of water per gram of granules per second.

About 635 g. of the granules so prepared are added to a 9 in.×13 in.×2 in. (apx. 23 cm.×33 cm.×5 cm.) baking pan. 350 g. of water and 73 g. of skim milk (0.5% by weight butterfat) are added to the mix. The mixture is then directly placed in an oven and baked at 350° F. (177° C.) for about 25 minutes to form a finished baked layer cake.

EXAMPLE III

A "salt-and-pepper" layer cake of unique character is prepared when about one half of the granules of the present example are substituted with an equivalent amount of the granules of Example I. The mixture of white and chocolate cake mix granules is mixed to form a random blend. Thereafter, about 640 g. of the blend is added to a baking pan. 350 g. of water is then poured into the pan. The mixture is then immediately baked at 350° F. (177° C.) for about 25 to 30 minutes. The resultant finished cake is characterized by a random array of separate and distinct layer cake regions of chocolate and white cake.

What is claimed is:
1. A dry mix for cakes, comprising flour, sugar, leavening, flavor, and color in the form of granules, said granules having:
   A. a particle size of from about 0.9 to 3.0 mm.;

B. a bulk porosity of from about 0.55 to 0.64;
C. a density of from about 0.45 to 0.7 g./cc.;
D. an initial rate of moisture absorption of from about 0.055 to 0.075 gram of water per gram of mix per second; and
E. a moisture content of less than about 5%.

2. The dry mix of claim 1 wherein the cake component additionally comprises shortening and an emulsifier.

3. The dry mix of claim 2 wherein the granules have:
A. a particle size of from about 1.4 to 2.0 mm.;
B. a bulk porosity of from about 0.58 to 0.62;
C. a density of from about 0.50 to 0.60 g./cc.;
D. an initial rate of moisture absorption of from about 0.055 to 0.060 gram of water per gram of mix per second; and
E. a moisture content of less than about 4%.

4. The dry mix of claim 3 wherein the granules having a moisture content of less than about 3%.

5. The dry mix of claim 3 wherein the granules comprise a mixture of a first fraction of granules having a first color and a second fraction of granules having a second color.

6. The dry mix of claim 5 wherein the first fraction has a first flavor and the second fraction has a second flavor.

7. The dry mix of claim 6 additionally comprising from about 1% to 10% by weight of particulate materials selected from the group consisting of chocolate chips, candy pieces, flavoring nuts, fruit pieces, and mixtures thereof.

8. A method for preparing a cake, comprising the steps of:
A. providing dry granules said granules being formed of full formulation dry mix for cakes, said granules having:
1. a particle size of from about 0.9 to 3.0 mm.;
2. a bulk porosity of from about 0.55 to 0.64;
3. a density of from about 0.45 to 0.70 g./cc.;
4. an initial rate of moisture absorption of from about 0.055 to 0.075 gram of water per gram of mix per second; and
5. a moisture content of less than about 5%, said full formulation dry mixes comprising flour, sugar, shortening, flavor, and color;
B. hydrating said granules in the absence of agitation by combining with sufficient moisture containing liquids to yield a moisture content of from about 35% to 45%; and,
C. baking in a baking container.

9. The method of claim 8 wherein the cake mix component additionally comprises shortening and an emulsifier.

10. The method of claim 9 wherein the granules have:
A. a particle size of from about 1.4 to 2.0 mm.;
B. a bulk porosity of from about 0.58 to 0.62;
C. a density of from about 0.50 to 0.60 g./cc.;
D. an initial rate of moisture absorption of from about 0.055 to 0.060 gram of water per gram of mix per second; and
E. a moisture content of less than about 4%.

11. The method of claim 10 wherein the granules comprise a mixture of a plurality of fractions, each fraction having a distinguishing color.

12. The method of claim 11 wherein each fraction has a distinguishing second flavor.

13. The method of claim 12 additionally comprising the step of arranging the granule fractions into a pattern.

14. The method of claim 12 additionally comprising the step of arranging the granule fractions in a random array.

* * * * *